March 7, 1967  K. J. CLEEREMAN  3,307,726
MULTI-LAYERED THERMOPLASTIC ARTICLE
Filed Oct. 24, 1963  4 Sheets-Sheet 3
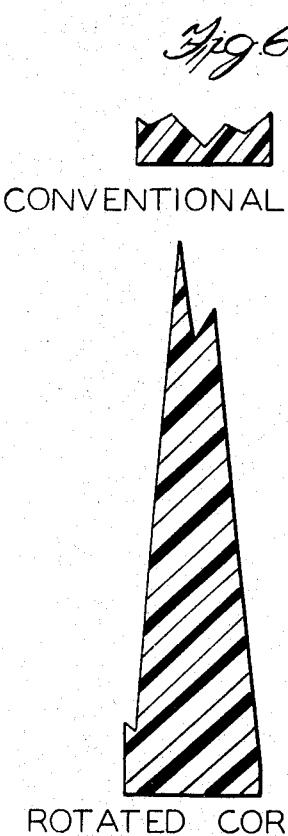
Fig.6.
CONVENTIONAL
ROTATED CORE
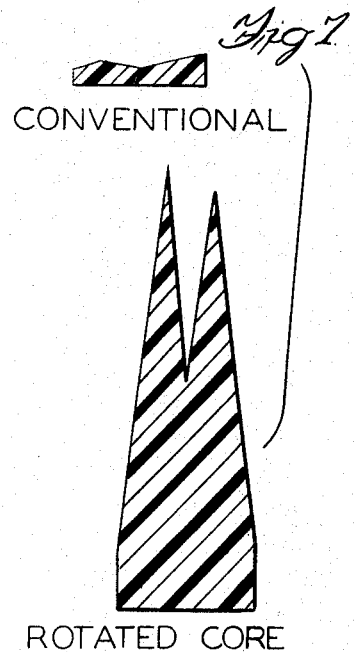
Fig.7.
CONVENTIONAL
ROTATED CORE
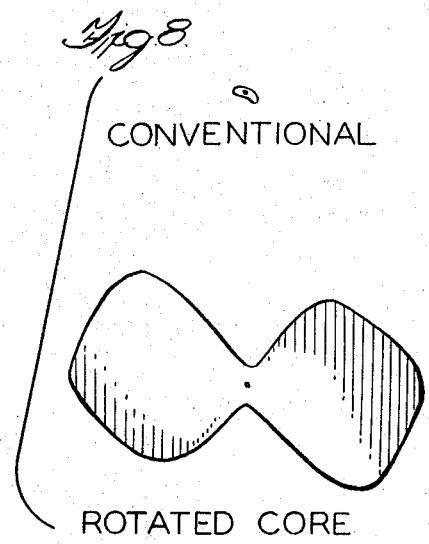
Fig.8.
CONVENTIONAL
ROTATED CORE
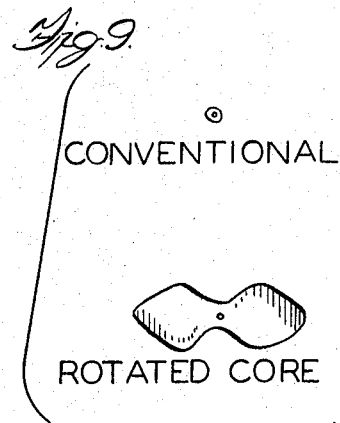
Fig.9.
CONVENTIONAL
ROTATED CORE
INVENTOR.
Kenneth J. Cleereman
BY Jerome Rudy and
Dominik, Rudy & Stein
Attorneys March 7, 1967  K. J. CLEEREMAN  3,307,726
MULTI-LAYERED THERMOPLASTIC ARTICLE
Filed Oct. 24, 1963  4 Sheets-Sheet 4
Fig. 10
BOTTOM OF CUP
CONVENTIONAL
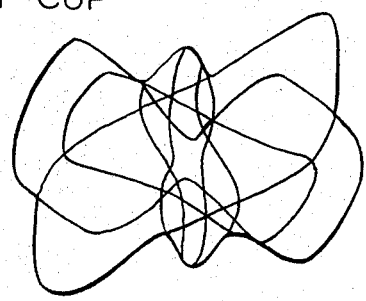
ROTATED CORE
Fig. 11
SIDEWALL OF CUP
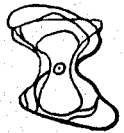
CONVENTIONAL
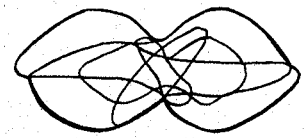
ROTATED CORE
INVENTOR.
Kenneth J. Cleereman
BY Jerome Rudy and
Dominik, Rudy & Stein
Attorneys United States Patent Office 3,307,726
Patented Mar. 7, 1967

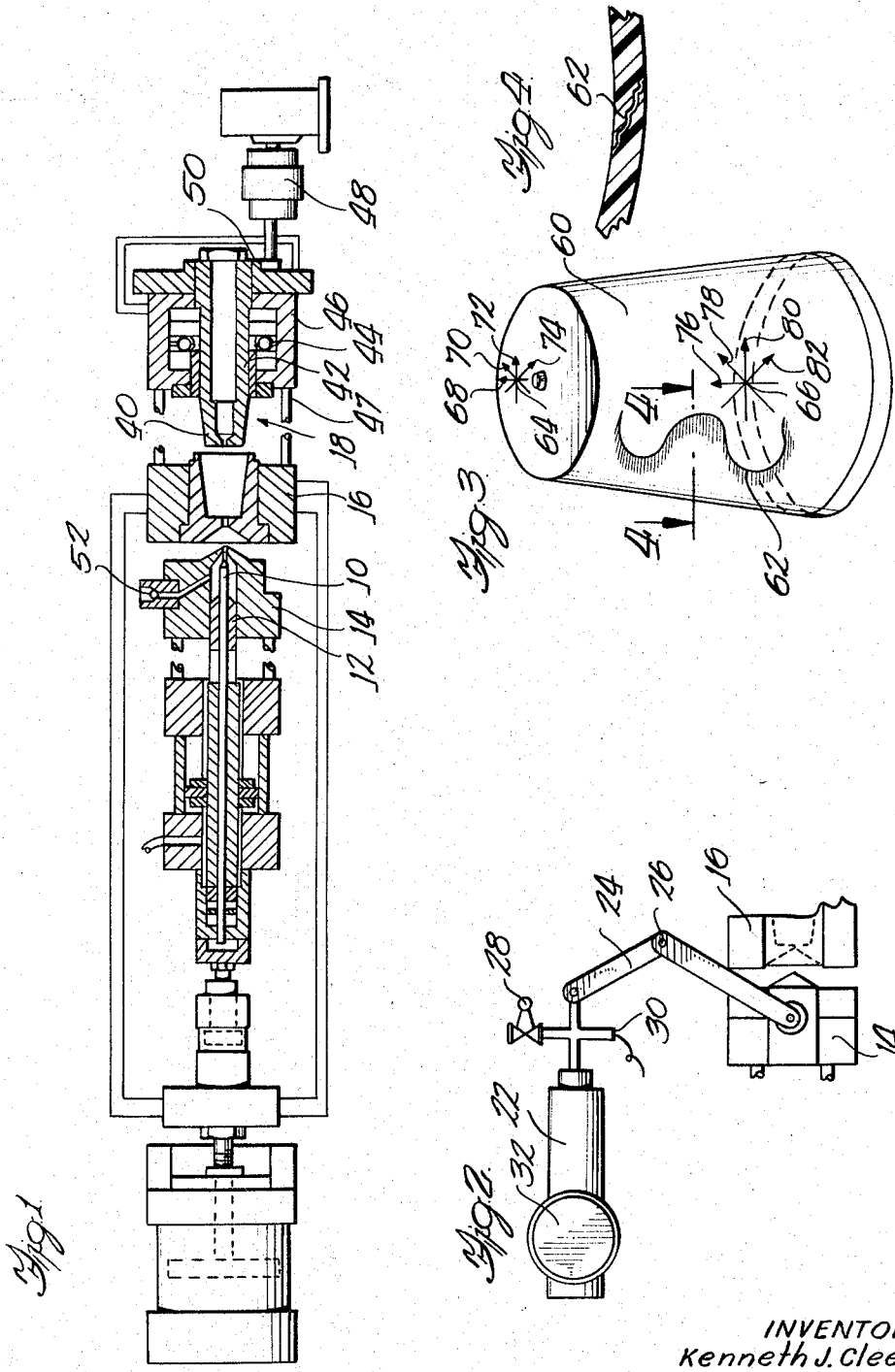

3,307,726
MULTI-LAYERED THERMOPLASTIC ARTICLE
Kenneth J. Cleereman, Midland, Mich., assignor to The Dow Chemical Company, Midland, Mich., a corporation of Delaware
Filed Oct. 24, 1963, Ser. No. 318,745
5 Claims. (Cl. 215—1)

This invention relates to a novel injection molding technique, to apparatus for uniquely accomplishing said technique and to products produced therefrom. More particularly, this invention relates to the injection molding of products of rotational symmetry wherein multi-directional orientation is automatically imparted to the plastic material used to mold the product.

Normally when a product is injection molded, molten plastic is injected through a gate in one direction at high pressure into a relatively cold mold. The sudden chilling causes unidirectional orientation of the plastic molecules, and mechanical weakness in the transverse direction of the molded product results.

However, because injection molding is very economical for forming articles of low-cost general purpose plastics, such as polystyrene, it has become very popular as a plastic forming means. In the past, the trade has disregarded or ignored many of the valuable mechanical properties of general purpose plastics. For example, general purpose polystyrene has a very high modulus of elasticity. It is available crystal clear and is easy to fabricate. It is also relatively low in cost. Yet, relatively few uses of this popular plastic utilize these highly desirable characteristics probably because they are too difficult to attain with the forming methods currently used. If such plastic could be injection molded with high controlled multi-directional orientation, many new products could be made with highly useful characteristics.

Some attempts have been made to obtain multi-directional orientation, but unfortunately, they have not been successful. For example, U.S. 2,372,177 issued March 27, 1945, claims that certain plastic material may be formed into relatively thin walled products with an effective grain direction extending helically thereof on the inner surface and longitudinally thereof on the outer surface. This is allegedly accomplished by a technique wherein, during injection molding, one part is moved relative to the other by a mechanical gear train. Movement of the mold part is tied to movement of the injecting piston.

Unfortunately, in actual practice, articles produced using the method described, such as cups, do not possess the alleged degree of multi-directional strength. They still crack or splinter or break easily along a line either parallel to the axis of the article or in a hoop direction. To applicant's knowledge, the technique has never been adopted by the trade, probably due to the fact that no one could successfully produce an article having the alleged multi-directional strength.

One object of this invention is to provide a novel injection molding process.

Another object is to provide an injection molding process which automatically manufactures rotational symmetric products uniquely possessing high multi-directional strength.

A further object is to provide apparatus which is capable of automatic injection molding of plastic products of rotational symmetry with a high multi-directional orientation.

A still further object is to provide injection molding apparatus, of the above character, which is capable of high speed, economical operation.

Another object is to provide plastic products of rotational symmetry having high strength in all directions.

Another object is to provide molded plastic products which have a unique laminar structure.

Another object is to provide molded plastic products of rotational symmetry wherein the molecular pattern is uniquely helicoidal through the thickness of the wall.

Another object is to provide plastic products of rotational symmetry which, by reason of their multi-ply structure oriented in different directions, resist puncturing, cracking, chipping, tearing and the like.

Other objects of the invention will in part be obvious and will in part appear hereinafter.

The invention accordingly comprises the several steps and the relation of one or more of such steps with respect to each of the others, the apparatus embodying features of construction, combinations and arrangements of parts which are adapted to effect such steps, and the product which possesses the characteristics, properties and relation of elements, all as exemplified in the detailed disclosure hereinafter set forth, and the scope of the invention will be indicated in the claims.

For a fuller understanding of the nature and objects of the invention, reference should be had to the following detailed description taken in connection with the accompanying drawings, in which:

FIG. 1 is a cross-sectional side view of an embodiment of an injection molding machine capable of performing the novel technique to produce a unique plastic article with multi-directional strength.

FIG. 2 is a top view of an extruder for feeding plastic in fluid condition to the apparatus of FIG. 1.

FIG. 3 is a perspective view of a cup after being subjected to a destructive force to cause cracking of the sidewall, said cup having been molded on the apparatus of FIG. 1 in accordance with the novel technique discussed in detail hereinafter.

FIG. 4 is a cross-sectional view of the cracked wall of the cup of FIG. 3 taken along lines 4—4.

FIG. 6 illustrates a similar comparison between the birefringence profile about a point on the outside surface of the bottom of a cup 90° from the direction of flow.

FIG. 7 illustrates a similar comparison of the birefringence profile about a point on the outside surface of the side wall of a cup 90° from the direction of flow.

FIG. 8 illustrates the birefringence anisotropy, as viewed from the outside in, of a center plane of the bottom of two cups or tumblers, the upper of a cup molded in accordance with the prior art technique, and the lower of a cup molded in accordance with the technique of this invention.

FIG. 9 illustrates a similar comparison of the birefringence anisotropy of the center plane of the sidewall of said cups.

FIG. 10 is a composite orientation pattern of four parallel planar surfaces through the bottom of two cups or tumblers, the upper of a cup molded in accordance with the prior art techniques and the lower of a cup molded in accordance with the techniques of this invention.

FIG. 11 illustrates a similar comparison of composite orientation patterns through the sidewall of said cups or tumblers.

Similar reference characters refer to similar parts throughout the several views of the drawings.

Figure 5:
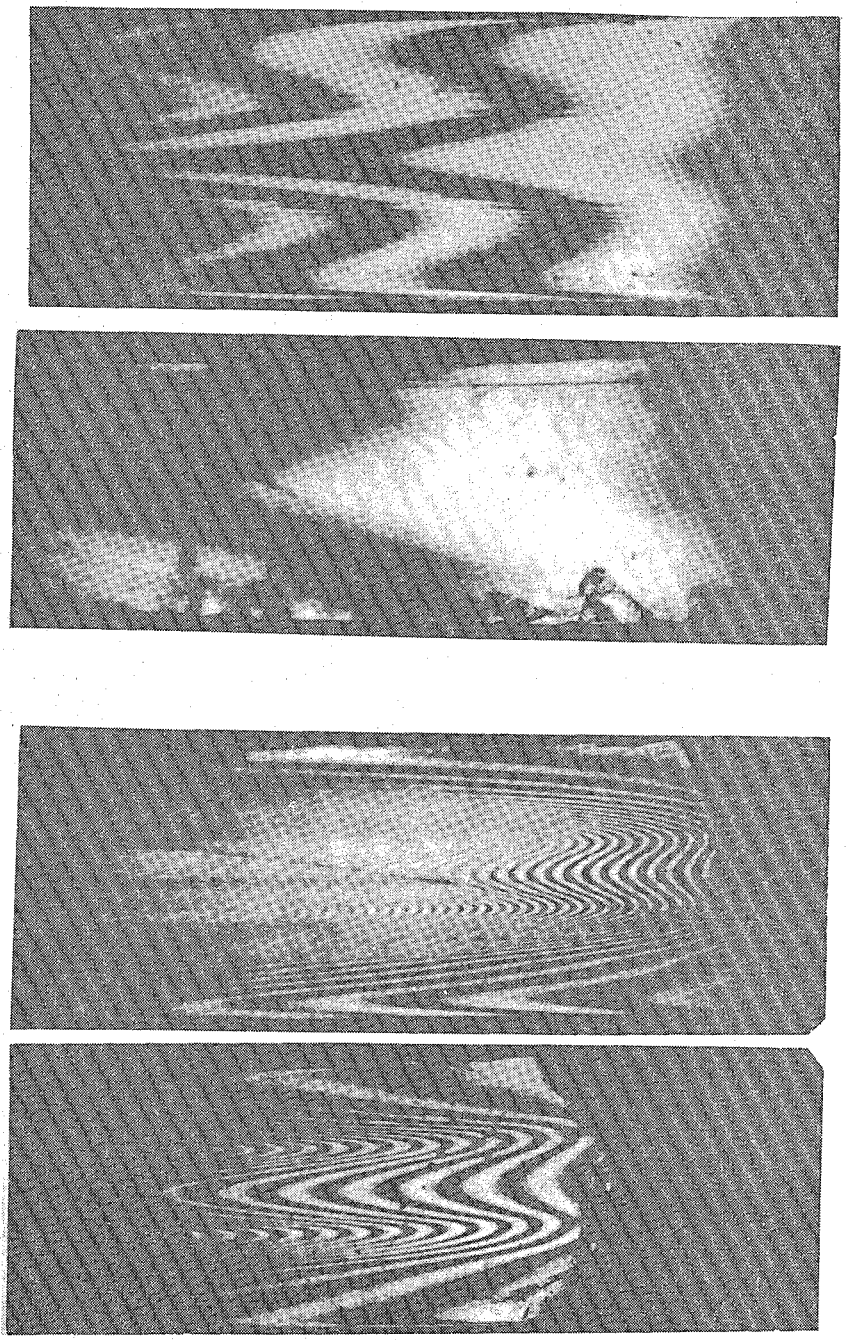
FIG. 5 illustrates the birefringence profile through the sidewall and bottom of a cup 90° from the direction of flow in accordance with the customary molded prior art technique as compared to a cup molded in accordance with the technique of the invention.

It has now been found that plastic products of rotational symmetry with high multi-directional orientation can be formed by the economical injection molding technique if one of the mold elements is rotated with a level of torque at least equal to the static torque level of the mold equipment and the particular plastic raw material being used so that torque will be applied not only while the liquid plastic is being injected into the mold cavity, but also while it is solidifying to its second order transition point. With such an arrangement, a point will be reached during the molding cycle whereby the plastic will acquire sufficient resistance to the applied torque that it will cause the rotating mold element to stall. Thus there is application of torque until the orientation imparted to the molecules is "frozen in."

More particularly, it has been found that when hollow plastic products, all or a portion of which have rotational symmetry, are injection molded while one of the mold elements forming said rotational symmetric portion is rotated with a torque of a level which permits continued rotation after the mold cavity is filled but is insufficient to overcome the resistant forces generated by the thermoplastic when it reaches its second order transition point (the point of solidification), the molecules therein will attain a high degree of multi-directional orientation in a layer-like helicoidal pattern of molecular thickness through the wall of said article. At such level of torque, the orientation is frozen into the article so that it will thereafter possess multi-directional strength. To define said torque level in another way, the torque should be sufficient to cause continued rotation of the rotatable element for short time after the mold is filled, but insufficient to damage or prevent solidification of the molded article.

The rotation of the mold element is preferably accomplished, as seen in FIG. 1, by rotating one member of the mold with a rotational means, wherein a certain preset level of torque is applied to the plastic as it flows into the mold cavity and solidifies. The level of torque applied depends upon the raw thermoplastic material used, the shape being molded, the surface characteristics of the mold, the machine utilized, and similar factors. Optimally, the level should be that of static torque which may be defined as the minimum torque needed to lock or stall the rotating mold element when the thermoplastic reaches its second order transition point.

One preferred torque applying means for the rotatable element of the mold is a presettable constant torque motor. It is capable of rotating the male member until the cooling thermoplastic article sets up sufficient resistant force to cause stalling. However, the present torque of said motor continues to act upon the mold element until the plastic solidifies. At this stage, the plastic is at its second order transition point.

The continued application of torques "freezes" in the orientation which was imparted to the molecules of said plastic during its injection into the mold cavity. Only at this time is the application of the actuating force terminated. The mold is now opened and the plastic article removed.

In essence, the process causes orientation by creating a condition wherein molecular flow is retarded while an elastic strain is placed upon the molecules. By freezing in this elastic strain due to cooling of the plastic, an oriented structure is uniquely achieved. Heretofore, such freezing in of elastic strain during cooling has been overlooked and this is probably the reason prior art teachings were inoperable.

The article molded as described above possesses a high degree of multi-directional orientation and has good flexibility in all directions, good crush strength, and is puncture resistant.

Examination of samples reveals the orientation is not biaxial. It is more fan-shape throughout the thickness of the article. At the midpoint of the cross-sectional thickness, the orientation is mainly in the hoop direction; at one surface, the orientation is about $+45°$ while at the other surface it is about $-45°$. A very strong semi-laminated structure is evident and such lamination obviously greatly increases the toughness of the molded article. When a destructive force is applied, a multi-laminated breaking occurs; and it becomes readily evident that the article has a plural ply structure.

Reference is now made to the drawings for a detailed description of the injection molding technique of the apparatus for uniquely effecting said process, and of the article that may be made therefrom.

As seen in FIGS. 1 and 2, which illustrate one embodiment of apparatus for effecting the novel injection molding technique to produce the unique article of this invention, the apparatus has a nozzle valve 10 and an injection plunger 12, both of which individually reciprocate within injection cylinder 14 to supply a metered amount of fluid thermoplastic material to the mold cavity defined by an outer stationary mold element 16 and an inner mating rotatable mold element 18.

A large hydraulic accumulator (not shown) is preferably used on the forward stroke of the injection plunger 12 to obtain high injection speeds. The injection valve prevents drooling and permits prepressurizing of the plastic in the injection cylinder, before it is released to the mold cavity. Indeed, it is preferred that this valve be actuated by a second hydraulic system which also utilizes an accumulator (not shown) so that in operation, both the valve accumulator and the plunger accumulator may be precharged to effect a desirable high speed and high pressure operation to the apparatus. Thus, both valves may be simultaneously opened after the mold cavity is closed to provide a controllable and extremely rapid injection speed. Control of this speed along with control over the temperature of the plastic and the extrusion, as will be explained hereinafter, allows considerable control over the orientation in the longitudinal direction. Control over orientation in other directions is effected by the unique operation of the rotatable mold element 18.

In the embodiment shown, molten, or more accurately, fluid thermoplastic is fed to the injection cylinder 14, in continuous fashion by extruder 22 (see FIG. 1) via flexible feed line 24, containing an elbow 26 for flexibility. A screw preplasticizer can also be used.

To effect accurate control over the pressure of extrusion, feed line 24 contains a relief valve 28 and a pressure control 30 which regulates movement of the ram of the extruder. Raw plastic, usually in bead or pellet form, is fed to the extruder via hopper 32, the top of which is seen in FIG. 2. Metering is obtained by presetting the stroke of the injection plunger 12. Now when the injection cylinder 14 is full while the plunger is still retracted, excess plastic is vented out through relief valve 28. Check valve 52 at the entrance to the injection cylinder 14 prevents the metered amount of polymer within the cylinder from escaping out the vent during the injection stroke of the plunger.

As indicated above, orientation of the plastic molecules in other directions is effected by the apparatus herein in that one of its mold elements is rotatable and there are controls over the torque applied to said element. In this instance, the male element of the mold cavity is rotatable; however, it should be understood that the female element could likewise be made rotatable.

As shown, the male element 18 comprises the forward end 40 of a mandrel 42, which is rotatably secured within a thrust bearing 44 within block 46. The entire block reciprocates upon slide rods 47 to permit opening and closing of the mold cavity.

Mandrel 42 and likewise the male element 18 is rotated by means of a presettable constant torque motor 48 via gear assembly 50 on the rear or other end of the mandrel 42.

Since it is presettable, motor 48 is capable of generating a torque up to a certain level. It should be evident that most any constant torque motor could be used. A hydraulically operated motor, such as a Vickers constant displacement piston motor No. MF2012-30-61, is a noteworthy example. With such a motor, oil under pressure, generated by a 25 horsepower Vickers pump capable of delivering seventeen gallons per minute of oil at 2000 p.s.i. is preferably used to supply the hydraulic power. Torque is controlled with a pressure relief valve (not shown) and the speed is controlled with a flow control valve (not shown). As an example of the level of torque cabable of being applied with a gear reduction of six-to-one, the motor, driven at a 1500 p.s.i. level, is able to apply a torque of 5400 lbs. per inch on the male element.

Another very useful motor is an electrical direct current series round motor such as the Model Super "T" sold by Reliance Electric and Engineering Company. Reference is now made to a specific example which illustrates the operation of the apparatus and the technique employed:

EXAMPLE I

Ten-ounce tumblers were molded using a one and one half inch extruder, the inside diameters of which were 2.6 inches, the height 3.71 inches and the wall thickness .045 inch. Styron 666 crystal, a polystyrene pellet grade manufactured by Dow Chemical Company, was utilized as the plastic raw material. The raw material was fed to the extruder 22, melted, pressurized, and fed to the injection cylinder 14 via feed line 24.

Hydraulic motor 48, powered as described above, was turned on as the mold cavity was closing. Thus, as the plastic was injected into the cavity, the torque built up to a preset pressure, as indicated in the tabular data below, at which time the motor stalled. The injected plastic was allowed to cool while the torque continued to act upon the male element 18 and consequently the injection molded tumbler. Just before the mold was opened, the hydraulic pressure was turned off so that the torque dropped to a zero level. In summation, the following operating conditions were used:

TABLE I

| Extruder | Rear temp. 400° F. Front temp. 450° F. Polymer feed 6 lbs. per hr. Feed arm 450° F. Vent valve 1200 p.s.i. |
| Injection cylinder | 450° F. |
| Mold temperature | Samples 1A through 1L of Tables II and III — 85° F. Samples 1M through 1X of Tables II and III — 60° F. |
| Clamp force | 21.5 ton. |
| Injection pressure | Sample 1A through 1L of Tables II and III—9300 p.s.i.; Sample 1M through 1X of Tables II and III—10000 p.s.i. |
| Torque on hydraulic motor | Varied as indicated in Table II. |
| R.p.m. of mold | Varied as indicated in Table II. |
| Time to fill mold | Approx. 1 sec. |
| Time from start of injection to motor stall | .14 to 2.5 secs. |

It might be noted that the friction of the rotating mandrel did not always stay constant. However, to enable a report in actual torque applied to the plastic, a pressure transducer was connected to a high speed recorder. With this arrangement, actual $\Delta P$ (oil pressure on hydraulic motor at stall minus the oil pressure required to turn the mandrel with the mold open) could be obtained and this is shown in Table II. This arrangement also permitted the plotting of a curve of oil pressure vs time which gave a measure of the time the motor turned after plastic started to fill the mold. From this the seconds required to stall the hydraulic motor was determined.

FIGS. 3 and 4 illustrate a tumbler 60 molded in accordance with the example above. In the illustration, an attempt has been made to define the multi-ply structure of the tumbler by reference to a crack 62 in the sidewall. The crack 62 propagates in a random direction and diagonally through the thickness of the sidewall. The crack shown, has, in this instance, attempted to advance along a left-handed helix at the inner face, in the hoop direction in the middle, and along a right-hand helix at the outer face of the sidewall. It is a wandering compromise over the usual straight line parallel to the axis of a tumbler molded with no orientation.

TABLE II.—BURSTING PRESSURE OF TUMBLERS WITH DIFFERENT DEGREES OF MULTIAXIAL ORIENTATION

| Sample No. | Mold, temp. | Hydraulic pressure on motor | Torque, lb. in., applied by hydraulic motor | R.p.m. of mold | Bursting pressure, p.s.i., using water | $\sigma_H$ using water | Secs. req'd to stall hydraulic motor | $\Delta P$ on hydraulic motor | Corrected torque, lb.-in. |
|---|---|---|---|---|---|---|---|---|---|
| 1A | 85 | 0 | 0 | 0 | 140 | 4,050 | | | |
| 1B | 85 | 300 | 1,100 | 63 | 165 | 4,800 | | | |
| 1D | 85 | 500 | 1,800 | 63 | 192 | 5,570 | | | |
| 1A | 85 | 0 | 0 | 0 | 140 | 4,050 | | | |
| 1C | 85 | 300 | 1,100 | 120 | 147 | 4,260 | | | |
| 1E | 85 | 500 | 1,800 | 120 | 211 | 6,120 | | | |
| 1F | 85 | 700 | 2,560 | 120 | 224 | 6,500 | | | |
| 1J | 85 | 900 | 3,300 | 120 | 290 | 8,400 | 1.6 | 625 | 2,280 |
| 1K | 85 | 1,100 | 4,000 | 120 | 264 | 7,650 | 2.0 | 750 | 2,730 |
| 1A | 85 | 0 | 0 | 0 | 140 | 4,050 | | | |
| 1O | 85 | 700 | 2,560 | 175 | 264 | 7,380 | | | |
| 1B | 85 | 900 | 3,300 | 175 | 246 | 7,150 | | | |
| 1L | 85 | 1,100 | 4,000 | 175 | 266 | 7,720 | 2 | 750 | 2,730 |
| 1M | 60 | 0 | 0 | 0 | 140 | 4,050 | | | |
| 1N | 60 | 300 | 1,100 | 92 | 169 | 4,900 | .14 | 105 | 380 |
| 1-O | 60 | 600 | 2,200 | 92 | 186 | 5,400 | .45 | 350 | 1,270 |
| 1P | 60 | 900 | 3,300 | 92 | 202 | 5,860 | 1.1 | 650 | 2,360 |
| 1Q | 60 | 1,150 | 4,200 | 92 | 232 | 6,740 | 1.6 | 800 | 2,900 |
| 1M | 60 | 0 | 0 | 0 | 140 | 4,050 | | | |
| 1U | 60 | 600 | 2,200 | 170 | 240 | 7,000 | | | |
| 1T | 60 | 900 | 3,300 | 170 | 226 | 6,550 | | | |
| 1S | 60 | 1,150 | 4,200 | 170 | 268 | 7,780 | 1.6 | 750 | 2,730 |
| 1X | 60 | 1,300 | 4,700 | 170 | 267 | 7,750 | | | |
| 1R | 60 | 1,500 | 5,500 | 170 | 266 | 7,730 | 2.5 | 975 | 3,540 |

As stated, FIG. 4 illustrates the diagonal crack across the thickness of the sidewall following somewhat the multi-planes therein.

It might also be noted that the crack has a large area per unit length. In tumblers without orientation, the crack, being parallel to the axis of rotation, vertically linear and radially in a straight line through the sidewall, has minute area per unit length.

Insofar as visual appearance goes, it is not possible to tell any difference between a conventional injection molded tumbler and one in which the male half of the mold was rotated. Such two tumblers were subjected to various tests as follows:

Puncture testing

A punch was jabbed through each tumbler. The value of multi-axial orientation was very evident. Everytime the tumbler made with a rotating male element of certain torque was jabbed with a punch, both in the bottom and side walls, the tumbler did not split, the hole made was fairly clean with some laminar separation around the hole, whereas the tumbler with no rotation or ineffectual rotation split every time parallel to the flow direction. The latter tumbler was obviously unidirectionally oriented only in the flow direction while the former must have been multi-axially oriented.

Squeeze test

Upon squeezing each tumbler at the lip, the tumbler without rotation split, whereas the tumbler with rotation, broke in a laminar fashion. Of importance is the type break obtained. In the former, the fracture was a weak break perpendicular to the surface. The tumbler with rotation was more difficult to fracture and the fracture was at some angle other than 90°. Also, crazing did not develop parallel to the flow direction but rather at some angle to it.

Drop test

A really dramatic test was slamming both tumblers against a surface and on the floor so that each tumbler would hit on the bottom radius. The tumbler without rotation always flew apart. The tumbler with rotation would bounce back with only a laminar fracture at the contact point.

Non-solvent burst test

A burst tester was designed to test differences between uniaxially oriented tumblers.

In such testing, the bottom is first cut off the tumbler and then it is sealed at the top and bottom in the tester and filled with water. The pressure is then increased until the sidewall breaks. The pressure to break is recorded from which the hoop stress is calculated using the equation:

$$\sigma_H = \frac{P \cdot r}{b}$$

$r = 1.305$ inches
$b = .045$ inch
$P = $ p.s.i. to burst

Table II shows the results of these tests. As can be seen from the table, as the torque applied by the hydraulic motor on the tumbler increased, its bursting strength increased. It appears that a maximum strength is reached after which the bursting pressure holds constant with increasing degrees of orientation or it may even decrease.

It might be noted that the bursting strength of tumblers with high multi-axial orientation is double that of tumblers with no multi-axial orientation.

The type of fracture obtained when testing in the burst tester was also studied. The tumblers with the lesser degrees of multi-axial orientation and burst strength give a much more brittle failure.

Solvent burst strength test

Samples 1A, 1C, 1E, 1F, 1J, and 1K were put in the burst tester with Mazola oil as the pressurizing fluid. The hoop stress was held at 2000 p.s.i. and the time required for the tumblers to fail was measured. Data is shown in Table III.

As can be seen from the data, as the orientation increased, the time required to fail increased. Tumblers molded without rotating the male element broke in 0.1 minute; however, tumblers with a high degree of multi-axial orientation went several thousand minutes before failure.

TABLE III.—MECHANICAL PROPERTIES OF TUMBLERS WITH DIFFERENT AMOUNTS OF MULTIAXIAL ORIENTATION

| Sample No. | Level of multiaxial orientation as measured by the torque applied by the hydraulic motor | Time to burst—minutes at $\sigma_H = 2{,}000$ p.s.i., in Mazola oil | Heat Distortion (Vicat Test) °C. | Flexure Strength (Hoop Direction) | | Tensile Strength Long. Dir. Test condition [c], p.s.i. to break |
|---|---|---|---|---|---|---|
| | | | | Test condition [b—(1)], # to break | Test condition [b(2)], # to break | |
| 1A | 0 | .1 | 92 | 5.5 | 6.5 | 8,600 |
| 1C | 1,100 | 5 | 91 | 12.1 | 11.4 | 6,200 |
| 1E | 1,800 | 27 | 92 | 12.4 | 12.3 | 5,300 |
| 1F | 2,560 | 187 | 90 | 14.9 | 13.1 | 4,600 |
| 1J | 3,300 | 1,625 | 92 | 16.0 | 14.3 | 4,400 |
| 1K | 4,000 | *4,320 | 92 | 16.9 | 15.3 | 4,250 |

*Did not break, crazed after approx. 3,600 minutes—at 4,320 minutes hoop stress increased to 6,500 p.s.i. before tumbler broke.

Mechanical tests (a) *Point pressure.*—2" x 2" sections were cut from the wall of a tumbler. These were then set in a jig and tested as a diaphragm with center point loading. The test data on this type test was meaningless. Samples cracked but no realistic failure point could be determined. However, when examining samples removed from the tester before final failure, interesting crack patterns were observed. Sample A with zero hoop orientation broke as a straight line parallel to the flow direction, Sample E with a moderate amount of hoop orientation cracked at an angle to the flow direction while Sample J with high hoop orientation broke with the typical laminar break of a multi-axial oriented sample.

(b) *Flexure.*—Rings were cut from the side wall of the tumbler and tested in flexure. Flexure tests were run with a 16–1 span to thickness ratio. Samples were ½ inch wide x .045 thick and were tested in two ways.

(1) With the concave side against the two fixed supports.

(2) With the convex side against the fixed supports.

Table III shows the results of these tests. As can be seen, the strength of the samples tested in flexure increases as the degree of hoop orientation increases. The percentage increase indicates that a very high degree of hoop orientation has been obtained.

(c) *Tensile strength.*—Samples were cut from the sidewall of the tumblers in the longitudinal direction. These samples were then milled into a typical tensile shape and tensile data obtained.

The cross section at the center was .21" x .045". Curved grips were used in the tensile tester to avoid cracking in the grips. Data are shown in Table III.

As can be seen, as the degree of orientation increases, the tensile strength in the flow direction uniquely decreases.

Such reduction in tensile strength may be explained as follows:

When filling a mold, orientation depends upon the shear stress applied to the plastic as it flows. This shear stress depends upon the polymer viscosity, temperature of the plastic and mold, and the rate of fill. By rotating one element of the mold, the shear stress required to fill the mold decreases.

Heat-shrink testing

When a tumbler molded with zero rotation is placed in an oven at 115° C., it shrinks in both length and radius. At the same temperature, a tumbler molded with moderate rotation (1800 lbs.-in. torque) warps because stresses are developed due to the fact that different layers of polymer are attempting to shrink in different directions. Vertical cuts made prior to the oven treatment eliminate some of this mutual restraint, and the tumbler walls twist somewhat.

A narrow vertical strip from a zero-rotation tumbler shortens in the oven whereas a similar strip cut from a tumbler molded with rotation twists into a helical form when heated. Finally, a semicircular sample cut from the bottom of a zero-rotation cut shrinks in the radial direction, and opens up (like a fan) in the zero-direction, while a similar sample cut from a cup molded with rotation curls up as well. This shrinkage behavior is consistent with the postulated pattern of frozen-in orientation.

Birefringence

The orientation of plastic may be accomplished by the proper adaptation of mechanical contrivances to stretch, draw, roll, or extrude the material at temperatures above the second order transition temperature. The orientation retained by a material produces an optical anisotropy or birefringence. The birefringence may be used as an index of the amount of orientation.

Procedure

One method for determining the average birefringence of a biaxial oriented sheet is the "wedge" method. It allows the measurement of birefringence at each of the two surfaces and through the thickness of an oriented sheet. This method of measuring birefringence serves to "finger print," to identify, or to characterize the orientation pattern, and is particularly suited for thick film or sheet. It has been used quite extensively in the orientation studies of heavy gauge biaxially oriented polystyrene sheet. This same wedge method was used here to study the orientation patterns of the injection molded tumbler.

In all measurements, two types of tumblers were studied. One was the conventionally molded tumbler in which the principal axis of orientation was in the flow direction of the melt which is from the sprue in the center of the bottom of the tumbler, outward radially across the bottom and then in a straight line toward the lip, parallel to the centerline of the tumbler. The other was the molded tumbler made with the male mold element or core being rotated.

Within each tumbler two localized areas were selected for study. One point 64 (see FIG. 3), was selected in the bottom of the cup ⅝" from the center 66 where the gate for the mold cavity was located. The orientation at this point in the cup made with the rotated core would be similar to orientation induced when a plastic is sheared between two flat circular discs which have a difference in rotational velocity. The second point 66 selected for study was located in the sidewall of the cup 1⅞" from the bottom. The orientation in this case, where the core is rotated, would be similar to orientation induced when a polymer is sheared in the space between rotating cylinders. In either case, however, axial motion is involved. For the conventional cup the orientation in both the bottom and sidewall could be representative of orientation induced by the shearing action of polymer flowing between parallel plates.

At each of these two points, the orientation was actually measured in four directions in the plane of the shell. For the bottom of the cup, the directions indicated by the arrows were (1) the radial flow direction arrow 68, (2) 45° clockwise from flow arrow 70, (3) 90° from flow arrow 72, and (4) 45° counterclockwise from flow arrow 74. In the sidewall of the cup, the directions were (1) the axial flow direction arrow 76, (2) 45° clockwise from flow arrow 78, (3) 90° from flow which is called the hoop direction arrow 80, and (4) 45° counterclockwise from flow arrow 82. An infinite number of directions could have been used, but four directions appeared sufficient to establish the general pattern of orientation characteristics:

(a) *Birefringence profile photograph.* — Looking edgewise at wedges cut with their bases in the 90° direction from flow, the birefringence profiles for the bottom and sidewall of tumblers made without and with a torque generating mold element were photographed. (See FIG. 5). The fringe patterns of these photographs is the orientation observed when looking at the edge of a section cut from the shell of the cup; the closer together the fringes, the higher the orientation, and the higher the strength. It will be noted that without a torque generating mold element, little, if any, orientation is attained at the point 90° from flow. Thus there will be no hoop strength.

(b) *Birefringence profile curves.*—Calculations made from these photographs are shown graphically in FIGS. 6 and 7, bottom and sidewall, respectively. Where the fringes are closest together in the photograph will be shown as high point on the curve.

The birefringence profile for the bottom of the conventionally molded tumbler (top curve of FIG. 6), indicates that there is no appreciable amount of orientation exhibited anywhere through the wall thickness. Consequently, if pressure were applied to the bottom of the cup, it would split easily in a straight line from the center of the bottom outward radially to the wall of the cup. Now looking at the bottom of the cup made with the rotated core (FIG. 6—bottom curve), it is seen that the orientation has been increased significantly. The skin or surface orientation in the flow direction where the polymer contacted the mold and core remains essentially the same as for the non-rotated core. But the orientation is almost immediately high through the thickness of the shell. It is thus seen that by rotating the core, a significantly tougher bottom has been made. Any break therein would assume a random pattern trying to seek the weakest direction in each layer.

FIG. 7 shows the birefringence profiles in the sidewall. The differences between the upper and lower curves noted are analogous to the differences discussed above concerning the bottom. And while the net amount of orientation is apparently lower for the sidewall, it is still sufficient to provide high strength.

(c) *Birefringence anisotropy.*—Viewing the cup from the outside in, the orientation pattern shown in FIG. 8 of the center plane exhibits no orientation for the conventional tumbler or cup. It would be brittle and would add nothing to the strength of the cup. In contrast, the cup made with a torque applying mold element, shows a center layer with an appreciable amount of orientation. Since it has significantly more orientation, it obviously exhibits greater toughness than the conventional cup.

FIG. 9 shows a similar orientation pattern for the center layer of the sidewall. The conventional cup again has no orientation while the center layer of the rotated core cup exhibits appreciable orientation in the hoop direction.

(d) *Composite orientation curves.*—FIGS. 10 and 11 show, respectively, orientation patterns for five layers through the bottom and sidewall of the tumbler or cup which have been superimposed. Such patterns are analogous to a five layered piece of laminated plywood. For the conventional cup, it is evident that four of the layers have their grain running in the same direction while the center layer has no grain at all. Such structure is easily split or cracked. The cup made by rotating the core has layers wherein the grain structure runs in different directions. The net effect is a significantly tougher part.

It will thus be seen that the objects set forth above, among those made apparent from the preceding description, are efficiently attained and, since certain changes may be made in carrying out the above process, in the described product, and in the constructions set forth without departing from the scope of the invention, it is intended that all matter contained in the above description (or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what I claim as new and desire to secure by Letters Patent is:

1. A thermoplastic article having rotational symmetry and a multi-layered structure, each layer of such structure having a molecular orientation different than the orientation in an adjacent layer thereto, whereby multi-directional strength is imparted to said article comprising an injection molded plastic with a birefringence pattern through its thickness at 90° from flow, substantially similar to that shown in the patterns effected with rotation in FIG. 5 of the drawing herein.

2. A thermoplastic article having rotational symmetry and a multi-layered structure, each layer of such structure having a molecular orientation different than the orientation in an adjacent layer thereto, whereby multi-directional strength is imparted to said article, comprising an injection molded structure, which has a birefringence profile pattern about a point of 90° from flow which exhibits an almost immediate high orientation through the thickness of the plastic structure.

3. A thermoplastic article having rotational symmetry and a multi-layered structure, each layer of such structure having a molecular orientation different than the orientation in an adjacent layer thereto, whereby multi-directional strength is imparted to said article, comprising an injection molded structure, wherein the area of the birefringence anisotropy curve of the central layer of the structure has an area at least two times the area of the birefringence anisotropy curve of the central layer of a similar structure without orientation.

4. A thermoplastic article having rotational symmetry and a multi-layered structure, each layer of such structure having a molecular orientation different than the orientation in an adjacent layer thereto, whereby multi-directional strength is imparted to said article, comprising an injection molded structure, wherein the superimposed composite orientation curve for a plurality of layers spaced equidistantly across the thickness of the structure of said article evidences when overstressed a grain structure which runs in different directions than the direction of flow.

5. An injection molded thermoplastic article having rotational symmetry comprising a multi-layered structure greater than three, each layer of such structure having a molecular orientation different than the orientation in an adjacent layer thereto whereby multi-directional strength is imparted to said article, the center layer having appreciable orientation in the hoop direction of said article.

References Cited by the Examiner

UNITED STATES PATENTS

| | | | |
|---|---|---|---|
| 2,372,177 | 3/1945 | Conner | 264—328 X |
| 3,030,668 | 4/1962 | Taylor | 264—311 |
| 3,092,440 | 6/1963 | Rex | 264—328 |
| 3,100,576 | 8/1963 | Frank | 215—1 |
| 3,131,432 | 5/1964 | Battell | 18—30 |
| 3,141,197 | 7/1964 | Hann | 18—30 |
| 3,159,701 | 12/1964 | Herter | 264—328 |
| 3,165,218 | 1/1965 | Hauert | 215—1 |

JOSEPH R. LECLAIR, *Primary Examiner.*

ROBERT F. WHITE, *Examiner.*

R. B. MOFFITT, D. F. NORTON, *Assistant Examiners.*